US007988548B2

(12) United States Patent
Okada

(10) Patent No.: US 7,988,548 B2

(45) Date of Patent: Aug. 2, 2011

(54) GAMING APPARATUS AND PLAYING METHOD THEREOF

(75) Inventor: Kazuo Okada, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 930 days.

(21) Appl. No.: 11/939,996

(22) Filed: Nov. 14, 2007

(65) Prior Publication Data

US 2008/0146308 A1 Jun. 19, 2008

Related U.S. Application Data

(60) Provisional application No. 60/874,952, filed on Dec. 15, 2006.

(51) Int. Cl.
*G06F 17/00* (2006.01)

(52) U.S. Cl. ........................................................ 463/17

(58) Field of Classification Search ............... 463/16–25
See application file for complete search history.

(56) References Cited

U.S. PATENT DOCUMENTS

2008/0113713 A1* 5/2008 Fujimoto ........................ 463/16
2008/0220844 A1* 9/2008 Yokota et al. .................. 463/17
2008/0242390 A1* 10/2008 Kido .............................. 463/16
2009/0143141 A1* 6/2009 Wells et al. .................... 463/37

FOREIGN PATENT DOCUMENTS

WO WO2004/094013 A1 11/2004

* cited by examiner

*Primary Examiner* — Ronald Laneau
(74) *Attorney, Agent, or Firm* — NDQ&M Watchstone LLP

(57) ABSTRACT

For a number of execution times of roulette game in a roulette game machine (1), if the number of land-in times at a prescribed numbered pocket (23) has become equal to or greater than a reference time number, then from among a plurality of control data sets such a control data set that is different from a current control data set is determined to be referred to.

8 Claims, 12 Drawing Sheets

FIG. 1

| CONTROL DATA | | | REGIONS |
|---|---|---|---|
| MOTOR DRIVE TIME (sec) | BALL INITIAL VELOCITY | SHOT DELAY TIME (sec) | |
| 10 | INITIAL VELOCITY a | 0 | A |
| 11 | INITIAL VELOCITY b | 0.1 | B |
| 12 | INITIAL VELOCITY c | 0.2 | C |
| 13 | INITIAL VELOCITY d | 0.3 | D |
| 14 | INITIAL VELOCITY e | 0.4 | E |
| 15 | INITIAL VELOCITY f | 0.5 | F |

GAMING APPARATUS AND PLAYING METHOD THEREOF

CROSS REFERENCE TO RELATED APPLICATION

This application claims priority to U.S. provisional patent application Ser. No. 60/874,952 entitled "GAMING APPARATUS AND PLAYING METHOD THEREOF" filed on Dec. 15, 2006 and naming Kazuo OKADA as inventor, and which is incorporated by reference herein for all purposes.

BACKGROUND OF THE INVENTION

1. Field of the Invention

The present invention relates to a gaming apparatus such as a roulette game machine, and a playing method thereof.

2. Description of Related Art

In roulette games in the past, generally, a dealer threw a ball on a roulette wheel to play a game. In recent years, where automatization has advanced, there are gaming apparatuses proposed for a full-automatic progress of roulette game needing no dealer to throw a ball.

Among such gaming apparatuses, there is a gaming apparatus using the air to shoot a ball, as disclosed in WO 04/094013 A. For gaming apparatuses for a full automatic progress of roulette game, it has been a desideratum for the ball to drop, to be received, in any pocket with an even probability. Therefore, among such gaming apparatuses, there is one designed with irregularities on the surface of a ball truck to disturb actions of a ball, so that the ball drops in any pocket with an even probability.

SUMMARY OF THE INVENTION

According to a first aspect of the present invention, a gaming apparatus comprises a roulette wheel provided with a set of pockets each respectively given in advance a number corresponding thereto, a memory for storing a plurality of control data for controls to bias a reception probability of receiving a ball for a respective one of subsets of the set of pockets, a bet switch adapted for a bet operation to any pocket of the set of pockets, and a controller adapted to: (a) execute a roulette game to accept the bet operation, and to effect, with reference to a prescribed one of the control data, a spinning of the roulette wheel and a shooting of the ball, to have an increased reception probability of the ball for a prescribed subset of the set of pockets; and (b) execute the roulette game with reference to another control data different from the prescribed control data, as a number of times of reception by the prescribed subset of the set of pockets has reached or exceeded a prescribed time number.

According to a second aspect of the present invention, a gaming apparatus comprises a roulette wheel provided with a set of pockets each respectively given in advance a number corresponding thereto, a memory for storing a plurality of control data for controls to bias a reception probability of receiving a ball for a respective one of subsets of the set of pockets, a bet switch adapted for a bet operation to any pocket of the set of pockets, a time number switch adapted to input a prescribed time number as a trigger for interchanging the control data, and a controller adapted to: (a) execute a roulette game to accept the bet operation, and to effect, with reference to a prescribed one of the control data, a spinning of the roulette wheel and a shooting of the ball, to have an increased reception probability of the ball for a prescribed subset of the set of pockets; and (b) execute the roulette game with reference to another control data different from the prescribed control data, as a number of times of reception by the prescribed subset of the set of pockets has reached or exceeded the prescribed time number input by the time number switch.

According to a third aspect of the present invention, a gaming apparatus comprises a roulette wheel provided with a set of pockets each respectively given in advance a number corresponding thereto, a memory for storing a plurality of control data for controls to bias a reception probability of receiving a ball for a respective one of subsets of the set of pockets, a bet switch adapted for a bet operation to any pocket of the set of pockets, and a controller adapted to: (a) execute a roulette game to accept the bet operation, and to effect, with reference to a prescribed one of the control data, a spinning of the roulette wheel and a shooting of the ball, to have an increased reception probability of the ball for a prescribed subset of the set of pockets; and (b) execute the roulette game with reference to another control data different from the prescribed control data, as a number of times of reception by the prescribed subset of the set of pockets has reached or exceeded a prescribed time number, to change the prescribed time number randomly.

According to a fourth aspect of the present invention, a gaming apparatus comprises a roulette wheel provided with a set of pockets each respectively given in advance a number corresponding thereto, the set of pockets being distributed in a plurality of regions, a memory for storing a plurality of control data for controls to bias between the regions a reception probability of receiving a ball for a corresponding one of subsets of the set of pockets belonging to a respective one of the regions, a bet switch adapted for a bet operation to any pocket of the set of pockets, and a controller adapted to: (a) execute a roulette game to accept the bet operation, and to effect, with reference to a prescribed one of the control data, a spinning of the roulette wheel and a shooting of the ball, to have an increased reception probability of the ball for a prescribed subset of the set of pockets belonging to a prescribed one of the regions; and (b) execute the roulette game with reference to another control data different from the prescribed control data, as a number of times of reception by the prescribed subset of the set of pockets belonging to the prescribed region has reached or exceeded a prescribed time number.

According to a fifth aspect of the present invention, a playing method of a gaming apparatus comprises the steps of executing a roulette game to accept a bet operation to any pocket of a set of pockets provided to a roulette wheel and each respectively given in advance a number corresponding thereto, and to effect, with reference to a prescribed one of a plurality of control data for controls to bias a reception probability of receiving a ball for a respective one of subsets of the set of pockets, a spinning of the roulette wheel and a shooting of the ball, to have an increased reception probability of the ball for a prescribed subset of the set of pockets, and determining another control data different from the prescribed control data to be a target of reference, as a number of times of reception by the prescribed subset of the set of pockets has reached or exceeded a prescribed time number.

According to a sixth aspect of the present invention, a playing method of a gaming apparatus comprises the steps of executing a roulette game to accept a bet operation to any pocket of a set of pockets provided to a roulette wheel and each respectively given in advance a number corresponding thereto, and to effect, with reference to a prescribed one of a plurality of control data for controls to bias a reception probability of receiving a ball for a respective one of subsets of the set of pockets, a spinning of the roulette wheel and a shooting of the ball, to have an increased reception probability of the ball for a prescribed subset of the set of pockets, and determining another control data different from the prescribed control data to be a target of reference, as a number of times of reception by the prescribed subset of the set of pockets has reached or exceeded a prescribed time number input by a time number switch.

According to a seventh aspect of the present invention, a playing method of a gaming apparatus comprises the steps of executing a roulette game to accept a bet operation to any pocket of a set of pockets provided to a roulette wheel and each respectively given in advance a number corresponding thereto, and to effect, with reference to a prescribed one of a plurality of control data for controls to bias a reception probability of receiving a ball for a respective one of subsets of the set of pockets, a spinning of the roulette wheel and a shooting of the ball, to have an increased reception probability of the ball for a prescribed subset of the set of pockets, determining another control data different from the prescribed control data to be a target of reference, as a number of times of reception by the prescribed subset of the set of pockets has reached or exceeded a prescribed time number, and changing the prescribed time number randomly, after said another control data has been determined to be the target of reference.

According to an eighth aspect of the present invention, a playing method of a gaming apparatus comprises the steps of executing a roulette game to accept a bet operation to any one of regions each respectively including a corresponding one of subsets of a set of pockets provided to a roulette wheel and each respectively given in advance a number corresponding thereto, and to effect, with reference to a prescribed one of a plurality of control data for controls to bias between the regions a reception probability of receiving a ball for a corresponding subset of the set of pockets belonging to a respective one of the regions, a spinning of the roulette wheel and a shooting of the ball, to have an increased reception probability of the ball for a prescribed subset of the set of pockets belonging to a prescribed one of the regions, and determining another control data different from the prescribed control data to be a target of reference, as a number of times of reception by the prescribed subset of the set of pockets belonging to the prescribed region has reached or exceeded a prescribed time number.

BRIEF DESCRIPTION OF THE DRAWINGS

FIG. 1 is a diagram showing an example of control data.

DESCRIPTION OF THE EMBODIMENTS

First Embodiment

Figure 2:
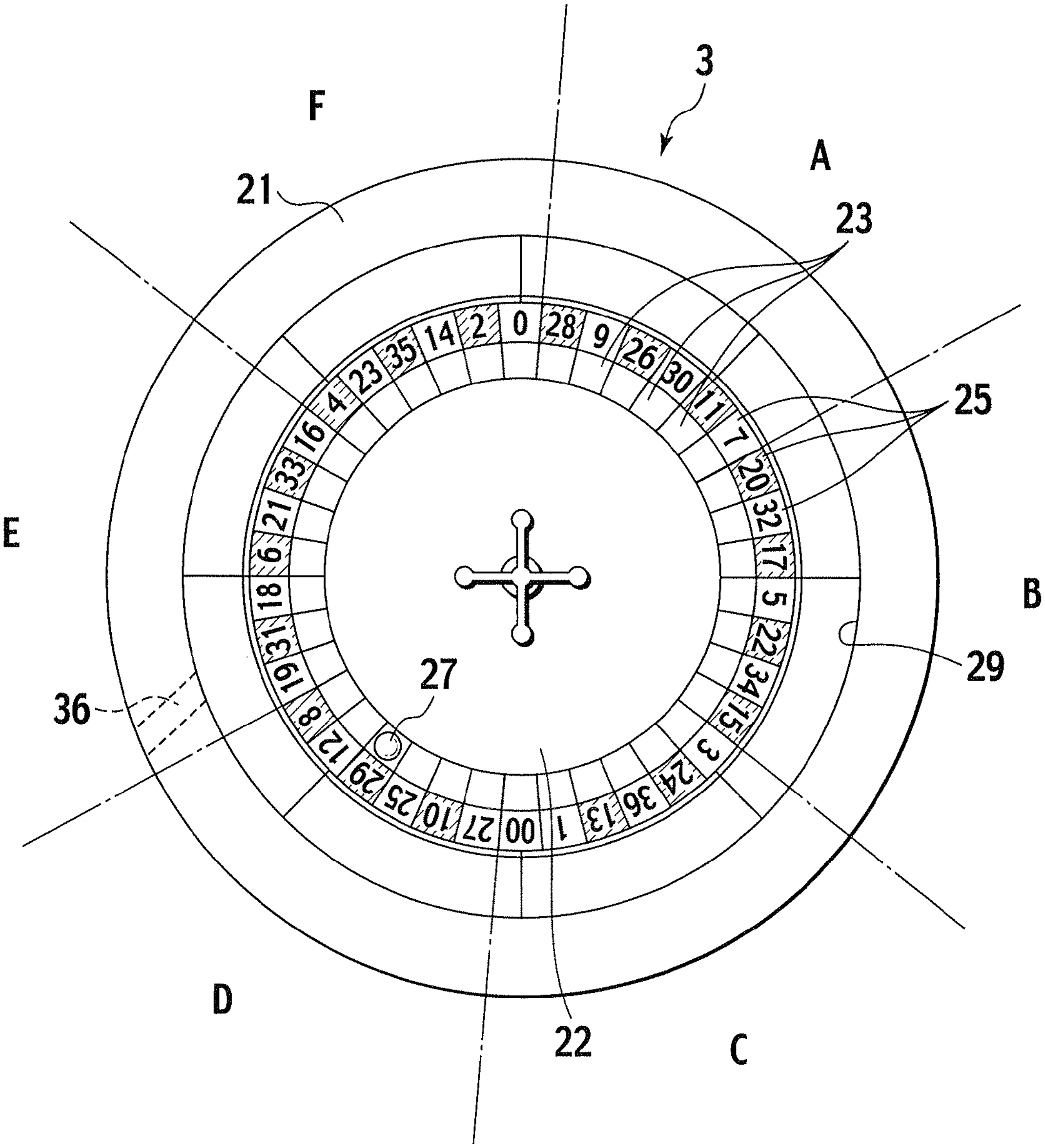
FIG. 2 is a plan view of a roulette apparatus according to a first embodiment of the present invention.
Figure 3:
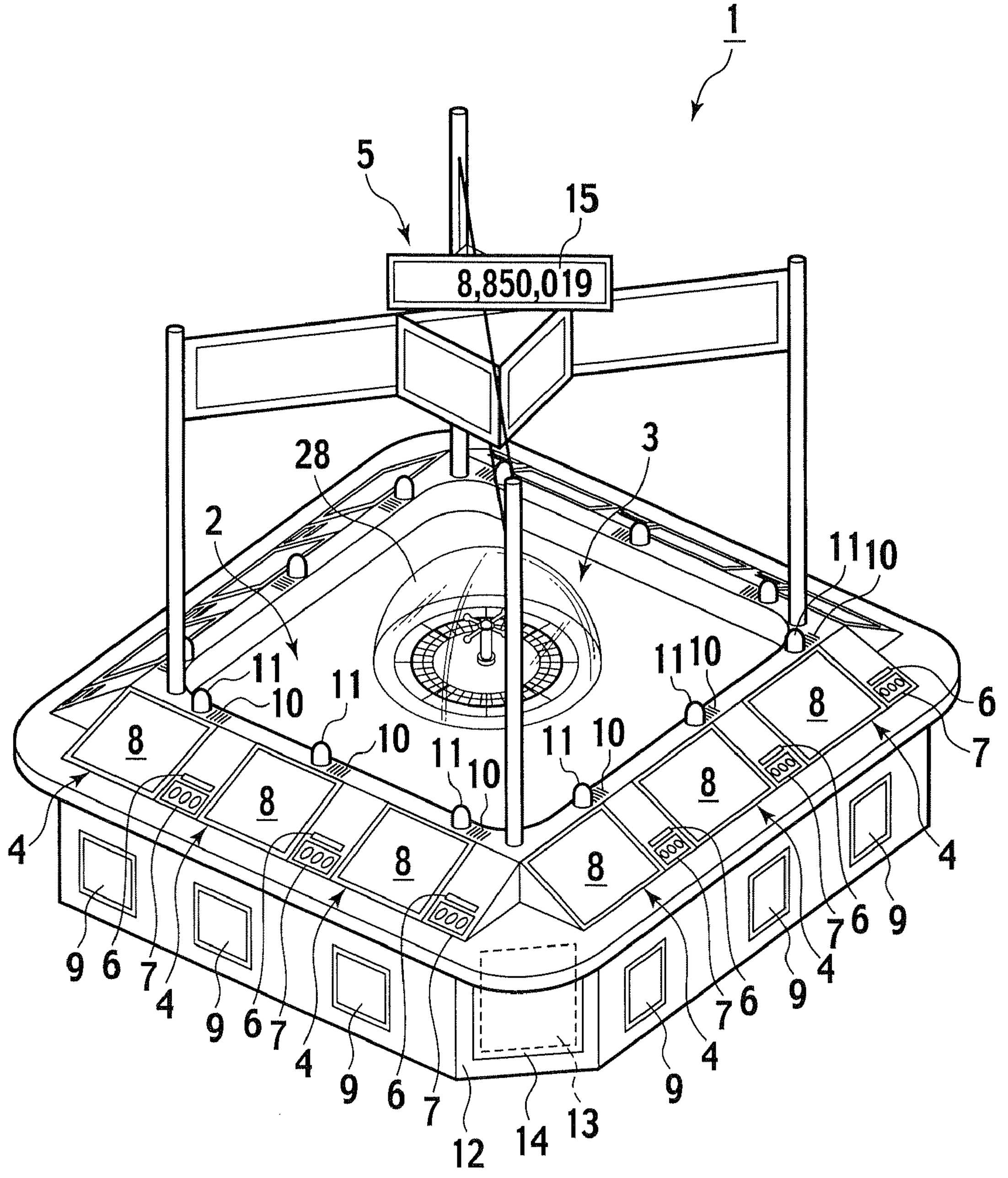
FIG. 3 is a perspective appearance view of a schematic configuration of a roulette game machine according to the first embodiment.

FIG. 2 is a plan view of a roulette apparatus according to a first embodiment of the present invention. FIG. 3 is a perspective appearance view of a schematic configuration of a roulette game machine according to the present embodiment. It is noted that the roulette game machine 1 is a gaming apparatus of a stand-alone type that is not connected to networks, while the present invention is applicable to a gaming apparatus connected to a network, as well.

As shown in FIG. 2, the roulette game machine 1 has a roulette device 3, which includes a frame 21 fixed to a casing member 2 (refer to FIG. 3), and a roulette wheel 22 rotatably accommodated and supported inside the frame 21. The roulette wheel 22 has "a multiplicity of (38 in total number in this embodiment) numbered recessed pockets 23 formed in the upside" (referred herein sometimes to "a total set of (numbered) pockets" or simply to "a set of (numbered) pockets"). Further, each numbered pocket 23 has any one of numbers "0", "00", and "1" to "36" assigned thereto, the number assigned to the numbered pocket 23 being indicated on a number plate 25 formed at the outside of the numbered pocket.

The frame 21 has a ball throw-in port 36 formed therein. The ball throw-in port 36 is connected to a ball thrower 104 (refer to FIG. 8). The ball thrower 104 shoots a ball 27, which is thrown from the ball throw-in port 36 onto the roulette wheel 22. Further, the roulette device 3 is entirely covered from above by a semispherical transparent acrylic cover member 28 (refer to FIG. 3).

Figure 8:
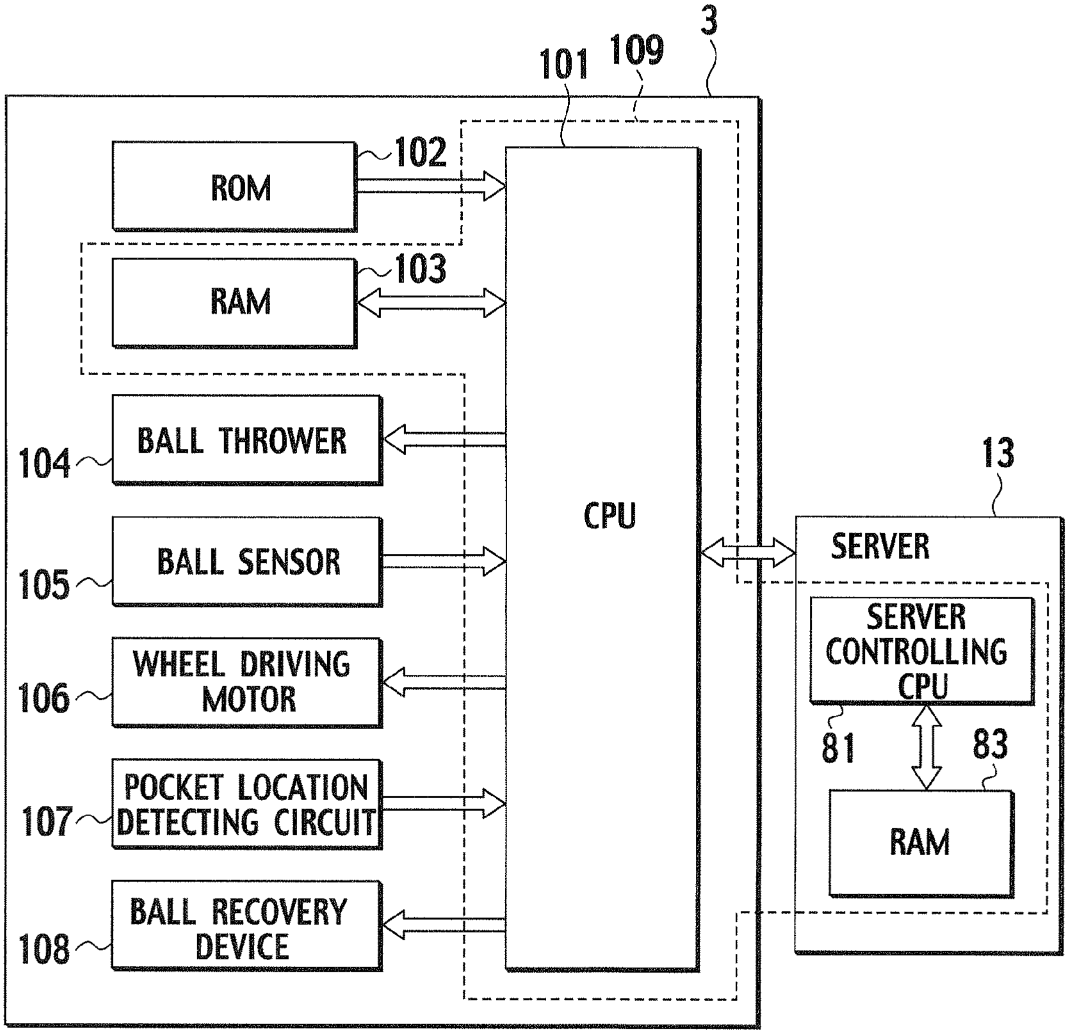
FIG. 8 is a block diagram showing an internal configuration of the roulette apparatus according to the first embodiment.

Under the roulette wheel 22, there is provided a wheel drive motor 106 (refer to FIG. 8). The roulette wheel 22 is adapted to spin, as the wheel drive motor 106 drives.

Further, under the roulette wheel 22, there are metallic plates (not shown) attached at prescribed intervals, for a configuration to allow positional detection of the numbered pockets 23 by a pocket location detecting circuit 107 (refer to FIG. 8) provided with proximity sensors detecting the metallic plates.

The frame 21 is gradually sloped inwards, with a guide wall 29 formed in the middle. The guide wall 29 guides a thrown ball 27, against centrifugal forces, having the ball 27 rolling to circle. As the rolling velocity is weakened, losing centrifugal forces, the ball 27 rolls down along a slope of the frame 21, inwardly onto the roulette wheel 22, which is then spinning. And the ball 27 having rolled onto the roulette wheel 22 further rolls on number plates 25 disposed in an outer region of the spinning roulette wheel 22, and in due course, settles down in any numbered pocket 23, where it is received. As a result, a number assigned to the numbered pocket 23 where the ball is received (referred herein sometimes to "ball land-in pocket") is discriminated by a ball sensor 105 (refer to FIG. 8). The number of the ball land-in pocket is sometimes referred to as "ball land-in number".

The spinning of the roulette wheel 22, as well as the shooting of the ball 27, is controlled on the basis of control data. FIG. 1 shows exemplary sets of control data.

As shown in FIG. 1, each set of control data includes a motor drive time, a ball initial velocity, and a shot delay time.

The motor drive time is an interval of time for driving a wheel drive motor 106 (refer to FIG. 8). The roulette wheel 22 is driven by the wheel drive motor 106 to spin by a prescribed spin speed for the motor drive time. It is noted that after a stop of drive by the wheel drive motor 106, the roulette wheel 22 has a gradually reduced spin speed, till it stops in due course. The ball initial velocity is an initial velocity when the ball 27 is shot from the ball thrower 104. The shot delay time is a time to elapse after a numbered pocket 23 (e.g. a pocket numbered "00") as a reference for a shot timing has passed a prescribed location, till the ball 27 is shot.

As shown in FIG. 2, the roulette wheel 22 is divided into six regions A to F, of which a respective one has "a set of six or seven neighboring numbered pockets 23" (as a subset of the total set of numbered pockets). Note that the respective region may have only one numbered pocket as the subset of the total set of numbered pockets.

Each set of control data is set up so that the ball 27 is received in a corresponding one of the regions A to F with a higher reception probability. For example, for a control to spin the roulette wheel 22 and shoot the ball 27 in dependence on a control data set of "a motor drive time set to 10 sec., a ball initial velocity set to 'a', and a shot delay time set to 0", this is set up so as to receive the ball 27 in the region A with a higher reception probability. The region that has a higher reception probability than other regions is referred herein sometimes to "biased region".

Control data sets may be set up individually every roulette device 3, or commonly to all roulette game machines 1.

The control data set to be referred to is switched every time when a prescribed condition (described later) is met.

In the example described, the regions A to F each have a set of six or seven neighboring numbered pockets 23. However, there is no specific limitation to the number of pockets that belong to the set, and the number of pockets of any set may be different from or identical to that of another set.

In the present embodiment, the numbered pockets 23 are allotted into, and grouped by, the six regions A to F. However, there is no limitation to the number of regions.

In the example described, the regions A to F do not overlap each other, and no pockets in any group belong to another group. It however is noted that a single pocket may belong to a plurality of groups.

The example described has a plurality of control data sets corresponding to the six regions (or sets or groups of pockets). However, there may be a plurality of control data sets not limited in correspondence to the regions (or sets or groups of pockets).

In the example described, the control data set is composed of a motor drive time, a ball initial velocity, and a shot delay time. However, there may be a control data set including a data for a spinning control of the wheel (e.g. motor drive time), a data for a timing to shoot the ball (e.g. shot delay time), or a data for a shooting velocity of the ball (e.g. ball initial velocity), alone or in combination.

For the spinning control of the wheel, the data may include, e.g., a spin speed of the roulette wheel when motor-driven, besides the motor drive time.

Description is now made of configuration of the roulette game machine 1. As shown in FIG. 3, the roulette game machine 1 includes the casing member 2, the roulette device 3 installed substantially on a central portion of an upside of the casing member 2, a plurality of (twelve, in this embodiment) stations 4 arranged around the roulette device 3, so as to enclose the roulette device 3, and an electronic display 5 disposed above the casing member 2.

The stations 4 each have, at least, a token insertion slot 6 for insertion of a bill, or a currency-value of game medium such as a chip or token employable in the game, a controller 7 provided with a plurality of controls such as control buttons operable to input prescribed instructions by the player, and a video display 8 for displaying a frame of picture associated with the game, and are each adapted to accept a bet operation of the player. Players are each allowed, looking a picture frame displayed on the video display 8, to give operations, such as to the controller 7 or a touch panel 50 (refer to FIG. 10), for progress of a roulette game to be developed.

Further, the casing member 2 is provided with token payout openings 9 at the lateral sides where the stations 4 are installed, and has a speaker 10 disposed at an upper right of the video display 8 of each station 4, to play music, sound effects, etc.

For each station 4, a win lamp 11 is provided at the top of the video display 8. The win lamp 11 is lit at any station 4 where a numbered pocket 23 that has received the ball 27 has been bet (more specifically, the number of the numbered pocket 23 has been bet). Further, in a JP bonus game to be executed, independently of and in parallel with roulette game, for distribution of a so-called jackpot (sometimes referred herein to "JP") as a golden opportunity to the players, at any station 4 that has won the JP, the win lamp 11 is lit. It is noted that any win lamp 11 is set in position to be visible from whole stations 4 (twelve in number in this embodiment) arranged on a roulette game machine 1, so that the lit state can be seen anytime from all other players playing on the roulette game machine 1.

The token insertion slot 6 has a token sensor 97 (refer to FIG. 10) disposed inside, for verifying a currency value of token or the like inserted from the token insertion slot 6, and counting inserted tokens. Further, the token insertion slot 6 has therein a hopper 94 (refer to FIG. 10) to deliver a prescribed number of tokens payable through the token payout opening 9.

A corner portion 12 at a corner of the casing member 2 has a server 13 disposed inside. Normally, the server 13 is accommodated inside the corner portion 12, to keep out of operations by a player. However, a key switch is provided for use to open a corner door 14 provided for the corner portion 12, to allow operations of the server 13. And, the server 13 is operable for various settings of the roulette game machine 1.

The electronic display 5 is provided with a JP amount display 15 for indicating an amount of JP (i.e. a later-described JP credit amount). For the roulette game machine 1 according to the first embodiment, three types of JP are arranged: a "mega" JP, a "major" JP, and a "mini" JP. The roulette game machine 1 is adapted to accumulate and reserve a credit amount of 0.15% of credits bet at all of the twelve stations 4, as a credit amount for the "mega" JP (sometimes referred herein to "mega JP credit amount" or simply to "mega JP credit"). Moreover, the roulette game machine 1 is adapted to accumulate and reserve a credit amount of 0.20% of credits bet at all of the twelve stations 4, as a credit amount for the "major" JP (sometimes referred herein to "major JP credit amount" or simply to "major JP credit"). Still more, the roulette game machine 1 is adapted to accumulate and reserve a credit amount of 0.30% of credits bet at all of the twelve stations 4, as a credit amount for the "mini" JP (sometimes referred herein to "mini JP credit amount" or simply to "mini JP credit"). The "mega JP credit (amount)", "major JP credit (amount)", and "mini JP credit (amount)" will sometimes be collectively referred herein to "JP credit (amount)".

The roulette game machine 1 is adapted to judge whether a payout of JP credit is to be made or not, and upon judgment of the payout of JP credit to be made, to further judge at which station 4 the payout of JP credit is to be made, and by which type of JP credit the payout is to be made.

On the JP amount display 15 is indicated an accumulated amount of "mega JP credit" (i.e. mega JP credit amount), out of those of the three types of "JP credit". It is noted that the JP amount display 15 is disposed at the top of the electronic display 5, so that the content of display is visible to players playing at any and all stations 4.

Figure 4:
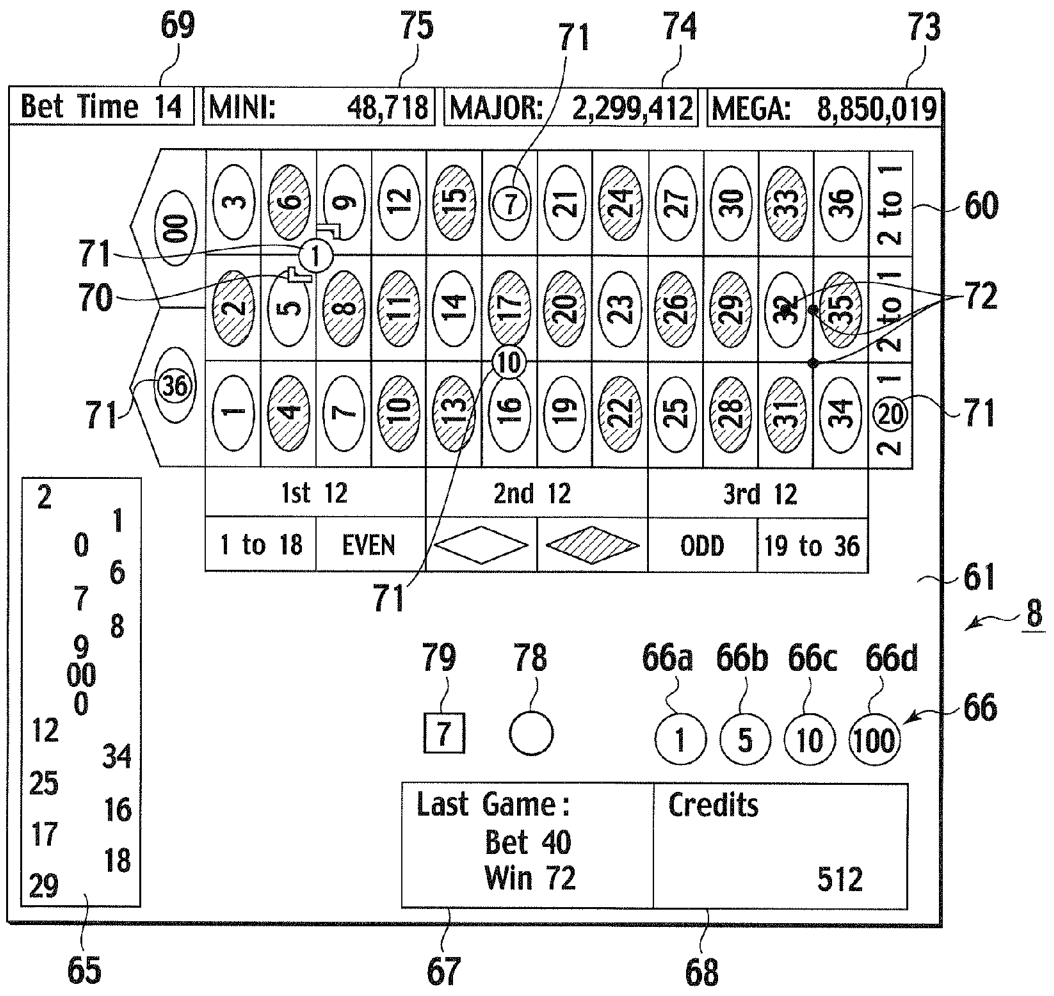
FIG. 4 is a diagram showing an example of a frame of picture displayed on a video display.

FIG. 4 shows an exemplary frame of picture displayed on the video display 8. As shown in FIG. 4, during the roulette game, the video display 8 displays thereon a bet picture frame 61 that has a table layout of betting board 60. On the front side of the video display 8, there is the touch panel 50, which is operable (i.e. accepts a bet operation) for the player to bet a chip or chips by using an amount of credit in hand.

Description is now made of the bet picture frame 61 to be displayed in the game, with reference to FIG. 4. The bet picture frame 61 to be displayed includes the table layout of betting board 60, which has a total number of 38 inside bet spaces (each referred herein sometimes to "section") numbered "0", "00", and "1" through "36" and arrayed in a grid form. It further has outside bet spaces (each referred herein sometimes to "box" or "rectangle") arrayed in a grid form, allowing a bet of chip to wager on 'odd numbers', 'even numbers', 'a kind of number plate color (red or black)', or 'a prescribed range of numbers (e.g. "1" to "12")'.

The bet picture frame 61 to be displayed further includes, under the table layout of betting board 60, a game result history display 65, a unit bet button array 66, a payout result display 67, and a credit amount display 68.

The game result history display 65 indicates a list of ball land-in numbers as results of roulette games up to the previous session (where one roulette game is defined as a set of sequences of events at stations 4 associated therewith, beginning with betting by players, through a reception of a ball 27 by a certain numbered pocket 23, concluding with payouts of credits in accordance with the number of the ball land-in pocket). Then, upon completion of each roulette game, the list has a new ball land-in number added thereto from above, allowing for confirmation of a history of ball land-in numbers of sixteen games as the maximum.

The unit bet button array 66 is configured as a set of button switches operable to bet a chip to a bet field 72 (that is, in a numbered section or marked or labeled box or rectangle, or on a table boundary line or grid line defining one or more sections) designated by the player. The unit bet button array 66 includes four types of buttons: a 1-bet button 66*a*, a 5-bet button 66*b*, a 10-bet button 66*c*, and a 100-bet button 66*d.*

For the bed, a bet field 72 is first identified by a player, by pressing the position on the picture frame directly, e.g. by a finger. The identified bet field 72 is defined by a cursor 70.

Under this condition, the player is allowed to press the 1-bet button 66*a* to thereby put a bet unit of one chip (i.e., for the number of bet chips to be incremented in the order of "1", "2", "3", . . . , every time when the 1-bet button 66*a* is pressed by a player with a finger or the like). Moreover, the player is allowed to press the 5-bet button 66*b* to thereby put a bet unit of five chips (i.e., for the number of bet chips to be incremented in the order of "5", "10", "15", . . . , every time when the 5-bet button 66*b* is pressed by a player with a finger or the like). Still more, the player is allowed to press the 10-bet button 66*c* to thereby put a bet unit of ten chips (i.e., for the number of bet chips to be incremented in the order of "10", "20", "30", . . . , every time when the 10-bet button 66*c* is pressed by a player with a finger or the like). Yet more, the player is allowed to press the 100-bet button 66*d* to thereby put a bet unit of one-hundred chips (i.e., for the number of bet chips to be incremented in the order of "100", "200", "300", . . . , every time when the 100-bet button 66*d* is pressed by a player with a finger or the like).

Further, in line with the unit bet button array 66, there is a combination of a reference time number increment switch 78 operable to set a reference time number as a trigger for changing control data, and a reference time number indicator 79 for indicating the reference time number thus set. The reference time number increment switch 78 is adapted to increment the reference time number by unity, each time when pressed by the player, and to reset the reference time number to a unity, when a maximal value is reached. It is noted that when the reference time number is exceeded by the number of times of ball land-in at a prescribed pocket 23, a certain control data else than a current control data is referred to, for a control to execute the roulette game.

It also is noted that the present embodiment, in which the reference time number is changed by the reference time number increment switch 78 operable by a player, may be modified to have a reference time number randomly changed for each of prescribed games, as will be described later.

The payout result display 67 indicates, with respect to the player in the previous roulette game, the number of bet chips, and the gross winning in terms of paid credit amount. It is noted that the gross winning minus the bet chip number equals the net winning, that is, a credit amount the player has additionally won in the previous game.

The credit amount display 68 indicates a current credit amount the player possesses. If the player bets, this credit amount is decreased in accordance with the number of bet chips (one credit per one chip). To the contrary, if the player receives a payout, the credit amount is increased in accordance with the number of paid chips. It is noted that if the credit amount becomes a null, the player loses the right to continue the game.

Further, the bet picture frame 61 has a bet time display 69 disposed above the table layout of betting board 60. The bet time display 69 indicates a remaining time for the player to bet. The bet time display 69 indicates a figure to be "20" when a reception of bet operation starts, which is decremented by unity every lapse of one second, and the reception of bet operation ends when the figure has come to "0". When the remaining time has come down to five seconds at each station 4 associated with the game, the ball thrower 104 is driven to throw a ball 27 onto the roulette wheel 22.

Further, the bet picture frame 61 has in line with the bet time display 69, in the right hand: a mini JP display 75 for indicating an accumulated credit amount for mini JP, i.e., a mini JP credit amount; a major JP display 74 for indicating an accumulated credit amount for major JP, i.e., a major JP credit amount; and a mega JP display 73 for indicating an accumulated credit amount for mega JP, i.e., a mega JP credit amount. The mini JP credit amount is an accumulated sum of credit amounts of 0.30% of credits bet every roulette game at all of the twelve stations 4. The major JP credit amount is an accumulated sum of credit amounts of 0.20% of the credits bet every roulette game at all of the twelve stations 4. The mega JP credit amount is an accumulated sum of credit amounts of 0.150% of the credits bet every roulette game at all of the twelve stations 4. Indicated values on the mega JP display 73, the major JP display 74, and the mini JP display 75 are common to and among all of the stations 4, respectively.

If any type of JP credit is paid out, one of the displays 73, 74, and 75 corresponding to the payout of JP credit has a prescribed default value (200 credits for mini JP; 5,000 credits for major JP; or 50,000 credits for mega JP) indicated thereon as an initial value.

Further, the table layout of betting board 60 displays the cursor 70 that indicates a position corresponding to a bet field 72 currently designated by the player. Further, it displays, for each bet field 72 the player has bet until a current time in the game, a chip mark 72 for indication of that effect, the chip mark 71 indicating a figure thereon, which represents a total number of chips bet thereto. For example, FIG. 4 illustrates a chip mark 71 displayed with a figure "7" and put in a section of a number "18", which represents a total number of seven chips bet to wager on a pocket 23 numbered "18" only. It is noted that the way of wagering on a single number only, as above, is a betting method called "straight bet".

Further, in FIG. 4, there is a chip mark 71 displayed with a figure "1" and put on an intersection of four sections of numbers "5", "6", "8", and "9", which represents a single chip bet to wager on a combination of four pockets 23 numbered "5", "6", "8", and "9". It is noted that the way of wagering on a combination of four numbers, as above, is a betting method called "corner bet".

There are betting methods else than above, including: a "split bet" as a betting to wager on a pair of numbers by a chip put on a dividing line between sections of those paired numbers; a "street bet" as a betting to wager on a single row of three numbers (e.g. "13", "14", "15") by a chip put on a table boundary line at an end of a transverse (vertical, in FIG. 4) array of sections of those numbers; a "five bet" as a betting to wager on the combination of five numbers "0", "00", "1", "2", and "3" by a chip put in a position on the table boundary line where sections of numbers "00" and "3" meet; a "line bet" as a betting to wager on a pair of rows of numbers (six in total) (e.g. "13", "14", "15", "16", "17", "18") by a chip put in a position on the table boundary line where a dividing line between two transverse (vertical, in FIG. 4) arrays of sections of those numbers ends; a "column bet" as a betting by a chip put in any of three boxes labeled "2 to 1" to wager on a corresponding column of twelve numbers; and a "dozens bet" as a betting by a chip put in any of three boxes labeled "1$^{st}$ 12", "2$^{nd}$ 12", or "3$^{rd}$ 12" to wager on a corresponding combination of four rows of numbers (twelve in total). Still more, there are betting methods that employ any of six rectangles arrayed as a lowermost stage of the table layout of betting board 60 in FIG. 4, to wager on a combination of eighteen numbers to be each identified by which color ("red" or "black") the number plate has, whether it is odd number or even number, or whether it resides within a range of eighteen or less or within a range of nineteen or more. It is noted that these betting methods have their credit amounts payable per one of winning chips (dividend payout ratios), which are different from each other.

The bet picture frame 61 has a described format, whereto the player can give bet operations as follows. First, the player designates a bet field 72 (a numbered section or marked or labeled box or rectangle, or a table boundary line or grid line defining one or more sections) to be bet, by identifying the position on the picture frame with a directly pressing finger. As a result, the cursor 70 is moved onto the designated bet field 72.

Then, the player sequentially operates, by pressing down, one or more buttons (1-bet button 66*a*, 5-bet button 66*b*, 10-bet button 66*c*, 100-bet button 66*d*) of the unit bet button array 66 one or more times, as necessary, to bet on the designated bet field 72 a number of chips depending on bet unit(s) of the button(s) and the number(s) of times of operation. For example, the player may press down the 10-bet button 66*c* four times, the 5-bet button 66*b* one time, and the 1-bet button 66*a* three times, to bet a total number of 48 chips.

Figure 5:
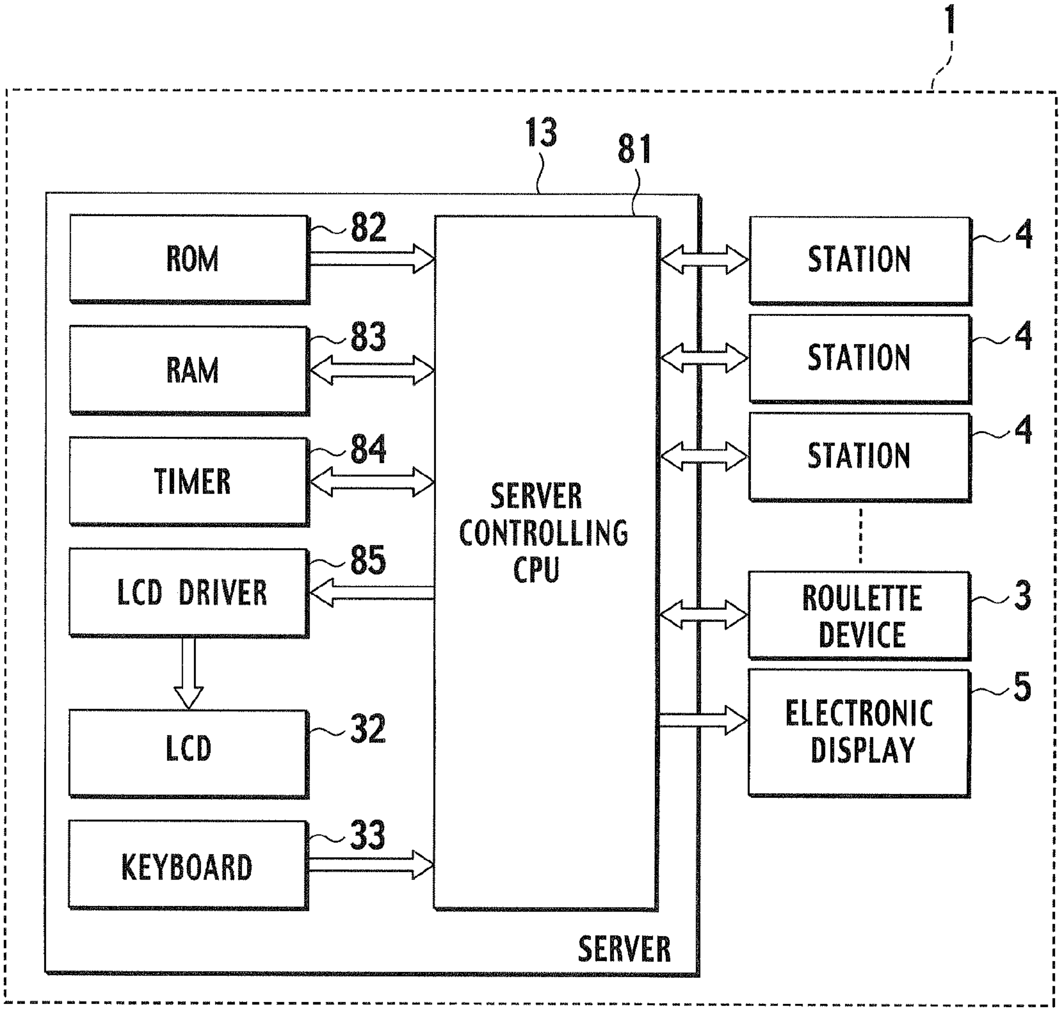
FIG. 5 is a block diagram showing an internal configuration of the roulette game machine according to the first embodiment.

FIG. 5 shows in a block diagram an internal configuration of the roulette game machine 1 according to the present embodiment. As shown in FIG. 5, the roulette game machine 1 includes the server 13, and the stations 4 (twelve in number in this embodiment) connected to the server 13, while the server 13 has connections to the roulette device 3 and the electronic display 5, as well. The roulette device 3 as well as each station 4 has an internal configuration described later on.

The server 13 has a server controlling CPU (central processing unit) 81 governing an entirety of the server 13, and includes a ROM 82, a RAM 83, a timer 84, a liquid crystal display (referred herein sometimes to "LCD") 32, and a keyboard 33 each respectively connected to the CPU 81, the LCD 32 being connected thereto via an LCD driver 85.

The server controlling CPU 81 is configured to implement a variety of processes in accordance with input signals supplied from respective associated stations 4, as well as programs and data stored in the ROM 82 or the RAM 83, and follow a result thereof to transmit a command signal to each station 4, for a leading control of the station 4. In particular, the server controlling CPU 81 is adapted to transmit control signals to the roulette device 3, for controlling, e.g., the shooting of ball 27, as well as the spinning of roulette wheel 22.

The ROM 82 is composed of e.g. a semiconductor memory or the like, and is configured for storage of programs for implementation of basic functions of the roulette game machine 1, programs for notification of maintenance timings, as well as control and settings of notification conditions, programs for setting dividend payout ratios (credit amounts payable per one chip) of roulette game, programs for a leading control of each station 4, etc.

On the other hand, the RAM 83 is configured for temporary storage of bet information supplied from each station 4, a ball land-in number of the roulette device 3 discriminated by the ball sensor 105, JP credit amounts that have been accumulated till then, results of processes executed by the server controlling CPU 81, etc.

The server controlling CPU 81 has the timer 84 connected thereto for time measurement. The timer 81 is adapted to transmit temporal information to the server controlling CPU 81, where it is based on for the CPU 81 to control the shooting of ball 27, as well as the spinning of roulette wheel 22, as will be described later.

The server controlling CPU 81 is connected to the electronic display 5 (refer to FIG. 3), and is adapted for electroluminescent rendition by emission control of light, such as of LED (light-emitting diode), and for indication of prescribed letters and the like on the electronic display 5. In particular, it is adapted to have the JP amount display 15 of the electronic display 5 indicate a JP credit amount (a mega JP credit amount, in this embodiment) that has been accumulated till then.

Figure 6:
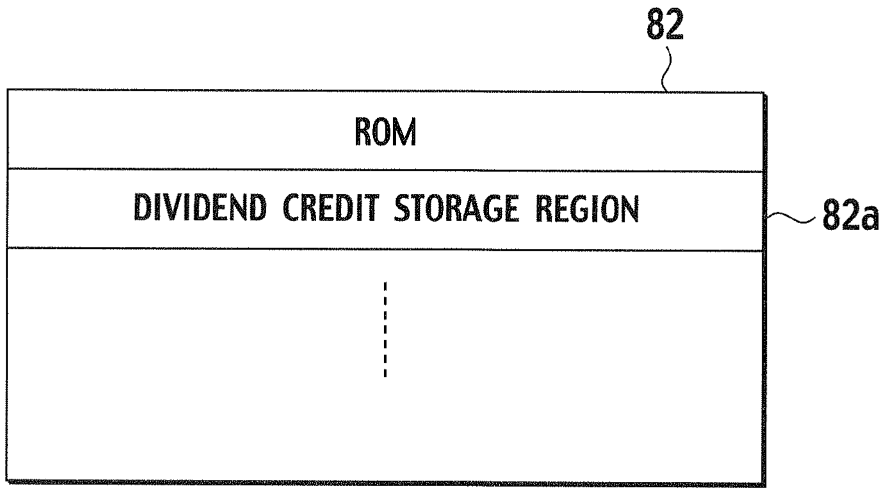
FIG. 6 is a pattern diagram showing a storage field of a ROM (read only memory) of the roulette game machine according to the first embodiment.

FIG. 6 is a pattern diagram showing a storage field of the ROM 82. As shown in FIG. 6, the ROM 82 has a dividend storage region 82*a* for storing dividend payout ratios of game.

The dividend payout ratios stored in the dividend storage region 82*a* are determined in advance within a range of "×2" to "×36", by the bet fields 72 and the betting methods ("straight bet", "corner bet", "split bet", etc.).

Figure 7:
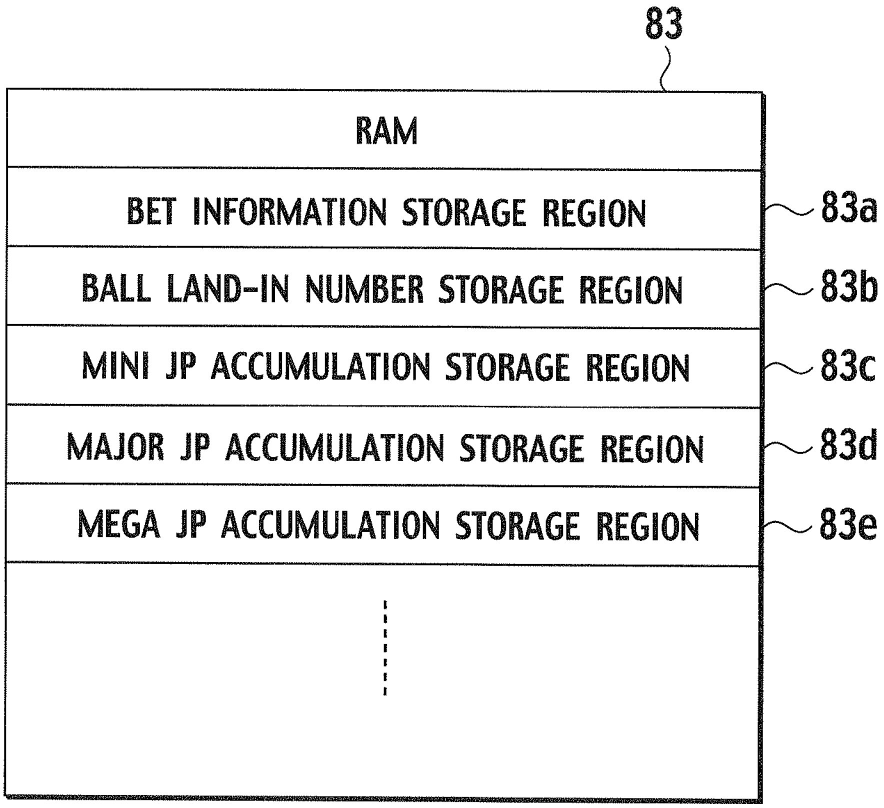
FIG. 7 is a pattern diagram showing a storage field of a RAM (random access memory) of the roulette game machine according to the first embodiment.

FIG. 7 is a pattern diagram showing a storage field of the RAM 83. As shown in FIG. 7, the RAM 83 has a bet information storage region 83*a* for storing bet information of each player in a current game, a ball land-in number storage region 83*b* for storing a ball land-in number of the roulette device 3 discriminated by the ball sensor 105, a mini JP accumulation storage region 83*c* for storing a mini JP credit amount, a major JP accumulation storage region 83*d* for storing a major JP credit amount, and a mega JP accumulation storage region 83*e* for storing a mega JP credit amount. It is noted that, specifically, the bet information includes information on any bet made by use of any station 4, covering any and all bet fields 72 designated on any bet picture frame 61 (refer to FIG. 4), numbers of bet chips (bet amounts), betting methods, etc.

FIG. 8 is a block diagram of an internal configuration of the roulette device 3 according to the present embodiment. As shown in FIG. 8, the roulette device 3 includes a CPU 101, a ROM 102, a RAM 103, the ball thrower 104, the ball sensor 105, the wheel drive motor 106, the pocket location detecting circuit 107, and a ball recovery device 108. The CPU 101, ROM 102, and RAM 103 cooperate with the sever controlling CPU 81 and RAM 83, to constitute a controller 109.

The CPU 101 is adapted to control the shooting of ball 27 and the spinning of roulette wheel 22, depending on control signals supplied from the server 13, following programs and data stored in the ROM 102 or RAM 103.

Figure 9:
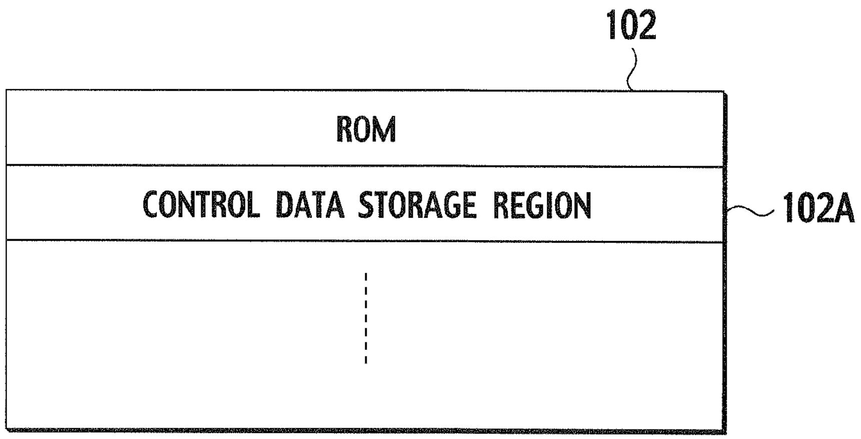
FIG. 9 is a pattern diagram showing a storage field of a ROM of the roulette apparatus according to the first embodiment.

FIG. 9 is a pattern diagram showing a storage field of the ROM 102. As shown in FIG. 9, the ROM 102 has a control data storage region 102*a* for storing sets of control data of such a configuration as described with reference to FIG. 1.

The pocket location detecting circuit 107 is provided with a proximity sensor, and is adapted for a detection of presence or absence of a metallic plate fixed to the roulette wheel 22, to thereby detect a position of the roulette wheel 22. The pocket location detecting circuit 107 outputs, to the CPU 101, a detection signal relating to a result of the detection.

The ball thrower 104 is a device for throwing a ball 27 through the ball throw-in port 36 (refer to FIG. 2) onto the roulette wheel 22. The ball thrower 104 is adapted to throw the ball 27 by an initial velocity set up in a control data set. Further, the ball thrower 104 is adapted to throw the ball 27 by a timing depending on a shot delay time set up in a control data set. That is, the ball thrower 104 throws the ball 27 with a lapse of the shot delay time, after detection of a numbered pocket as a reference of the timing having passed a prescribed position (e.g. in front of the ball throw-in port 36), by the pocket location detecting circuit 107.

The ball sensor 105 is a device for making a judgment of a ball land-in pocket. The wheel drive motor 106 is adapted for spinning the roulette wheel 22, and to stop the driving by lapse of a motor drive time set up in a control data set, after a start of the driving. The ball recovery device 108 is a device for recovering a ball 27 on the roulette wheel 22 upon completion of a game.

Figure 10:
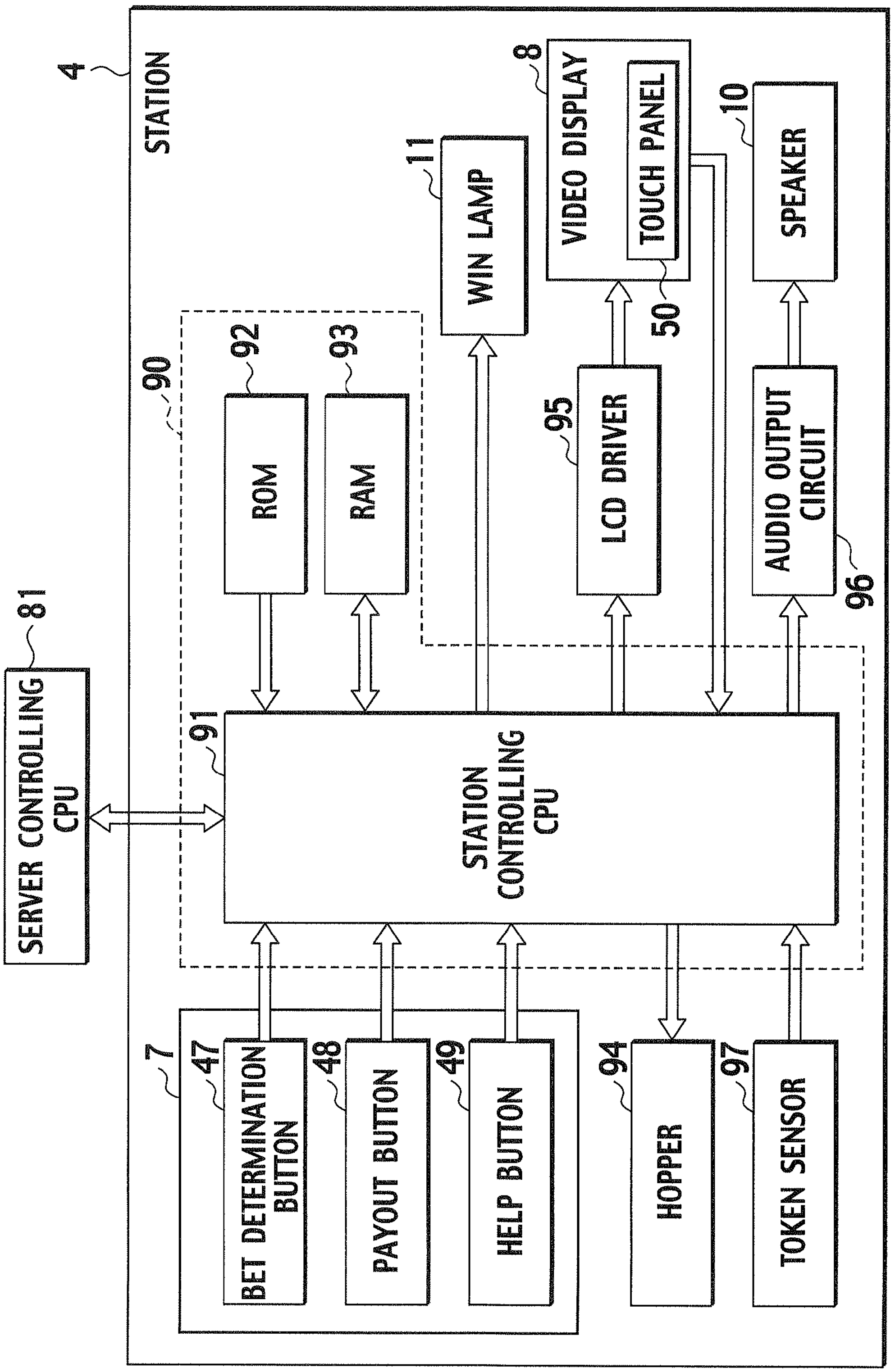
FIG. 10 is a block diagram showing an internal configuration of a station according to the first embodiment.

FIG. 10 shows in a block diagram an internal configuration of a station 4 according to the present embodiment. Each roulette game machine 1 is provided with twelve stations 4 that, basically, are identical in configuration. Description is now made of one of them.

As shown in FIG. 10, the station 4 includes a station controller 90 configured with a station controlling CPU 91, a ROM 92, and a RAM 93. The ROM 92, which may be composed of a semiconductor memory or the like, has stored therein a set of programs for implementing fundamental functions of the station 4, and varieties of programs, data tables, etc., as necessary for other control actions of the station 4. The RAM 93 is a memory for temporary storage of a variety of data of calculations in the station controlling CPU 91, a current amount of credits (accumulated in the station 4) to be possessed by a player, a state of bet of chips by the player, etc.

The station controlling CPU 91 is connected to a bet determination button 47, a payout button 48, and a help button 49 provided for the controller 7 (refer to FIG. 3), respectively.

The bet determination button 47 is a button switch to be pressed after a bet operation using the video display 8, to determine the bet. The payout button 48 is a button switch to be pressed typically at the end of a game, and when pressed, it allows a payout to be made at the token payout opening 9 by a number of tokens depending on the amount of credits (typically at a rate of one token per one credit) that a player has won, by a game or such, and then possesses. The help button 49 is a button switch to be pressed by a player wanting to know how to operate the game or the like, and when pressed, the help button 49 immediately responses by driving the video display 8 to display a frame of help picture that gives information of various operations.

Further, on the touch panel 50 of the video display 8, there is the reference time number increment switch 78 (refer to FIG. 4) adapted for a pressing operation to provide an operation signal, which is sent to the station controlling CPU 91, where it is processed under control of the station controlling CPU 91, to increment by unity the reference time number to be indicated on the reference time number indicator 79. This reference time number is reset to a unity, when a prescribed maximal value is reached.

The station controlling CPU 91 is configured for control to implement various actions depending on operation signals output thereto by pressing related button switches or the like. More specifically, it executes various processes in accordance with input signals supplied from the controller 7 in response to input operations by a player, as well as with programs or data stored in the ROM 92 or the RAM 93, to transmit their results to the server controlling CPU 81.

Further, the station controlling CPU 91 receives command signals from the server controlling CPU 81, to control peripherals constituting the station 4, and get a game under way at the station 4. Further, for some contents of processes, the station controlling CPU 91 executes a variety of processes in accordance with input signals supplied from the controller 7 in response to input operations by a player, as well as with associated programs or data stored in the ROM 92 or the RAM 93, to follow their results to control peripherals constituting the station 4, and get the game under way.

Further, the station controlling CPU 91 is connected to the hopper 94. This hopper 94 is configured to pay out, through the token payout opening 9 (refer to FIG. 3), a given number of tokens in accordance with a command signal from the station controlling CPU 91.

Further, the station controlling CPU 91 is connected to the video display 8, through an LCD driver 95. The LCD driver 95 includes a program ROM, a video ROM, a video controlling CPU, a work RAM, a VDP (video display processor), and a video RAM. The program ROM has stored therein a set of video controlling programs as well as various selection tables in conjunction with pictures to be displayed on the video display 8. The video ROM has stored therein, e.g., sets of dot data for formation of images to be displayed on the video display 8. The video controlling CPU is adapted to follow a video control program stored in advance in the program ROM to determine, from among data sets such as dot data sets stored in advance in the program ROM, a combination of data sets for a frame of picture to be displayed on the video display 8, in accordance with a combination of parameters set up by the station controlling CPU 91. The work RAM is configured as a temporary storage device for video control programs to be executed by the video controlling CPU. The VDP is adapted for formation of a frame of video to be output to the video display 8, in accordance with contents determined by the video controlling CPU. It is noted that the video RAM is configured as a temporary storage device for the video frame formation at the VDP.

The touch panel 50 is fixed on a front side of the video display 8, as described, and information on operations to the touch panel 50 is sent to the station controlling CPU 91. On the bet picture frame 61, the touch panel 50 is given operations of a player to bet chips. More specifically, the touch panel 50 is operated for selection of a bet field 72, operation of the unit bet button array 66, or the like, and a signal of the information is sent to the station controlling CPU 91. And, for a current player, the RAM 93 stores therein bet information (including the bet field 72 identified on the bet picture frame 61, and the number of bet chips) from time to time. Further, a signal of the bet information is sent to the server controlling CPU 81, to be stored in a bet information storage region of the RAM 83.

In addition, the station controlling CPU 91 is connected to an audio output circuit 96, and to the speaker 10, which is adapted for a variety of sound effects to be given along with various types of rendition depending on an output signal of the audio output circuit 96.

Further, the station controlling CPU 91 is connected to the token sensor 97. The token sensor 97 detects one or more tokens inserted through the token insertion slot 6 (refer to FIG. 3), making a calculation of inserted tokens, and send a signal of a result thereof to the station controlling CPU 91, where it is based on to increase the amount of credits stored in the RAM 93 to be possessed by the player.

Further, the station controlling CPU 91 is connected to the win lamp 11. For a wining by a chip bet on the bet picture frame 61 or a winning of a JP, the station controlling CPU 91 turns on the win lamp 11 to glow in a prescribed color.

Figure 11:
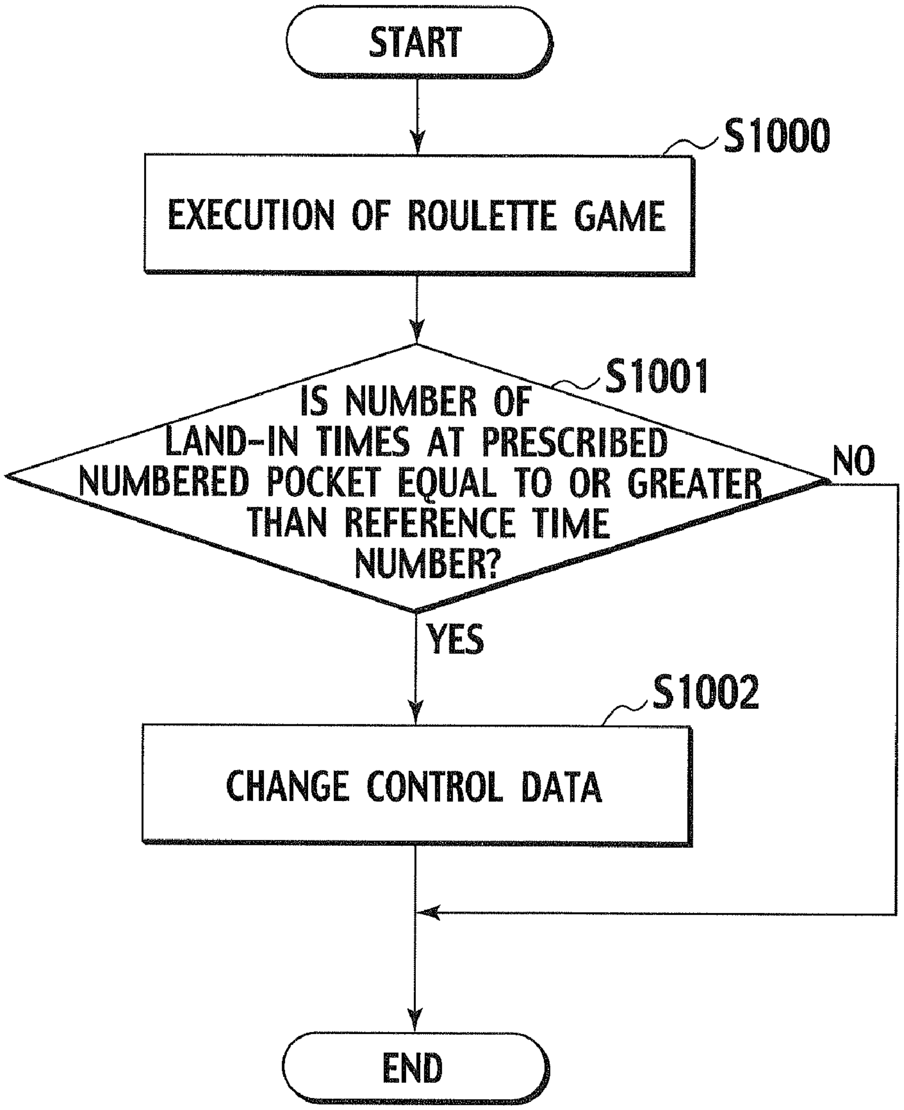
FIG. 11 is a flowchart showing an outline of a gaming process of the roulette game machine according to the first embodiment.

Description is now made of an outline of processes to be carried out by the roulette game machine 1 according to the present embodiment, with reference to a flowchart shown in FIG. 11. At a step S1000, the roulette game machine 1 executes a roulette game. At a step S1001, the roulette game machine 1 judges whether or not a current number of land-in times of ball 27 at a prescribed numbered pocket 23 is equal to or greater than a reference time number set up by a player through the reference time number increment switch 78, and if it is equal to or greater than the reference time number, the flow goes to a step S1002. Unless this condition is met, the process goes to an end. At the step S1002, the roulette game machine 1 changes a set of control data to be referred to. Thereafter, the roulette game machine 1 ends the process.

The processes to be carried out by the roulette game machine 1 are classified into a set of server end game processes to be executed by the server controlling CPU 81 of the roulette game machine 1, and respective sets of station end game processes to be executed by station controlling CPUs 91 of the twelve stations 4 associated therewith.

Accordingly, there will be described a combination of a flow of server end game processes to be executed by the server controlling CPU 81 and a flow of station end game processes to be executed by the station controlling CPU 91 at an arbitrary station 4, with reference made to FIG. 12 and FIG. 13. These figures cooperatively show a flowchart of game processes of the roulette game machine 1 according to the present embodiment.

Figure 12:
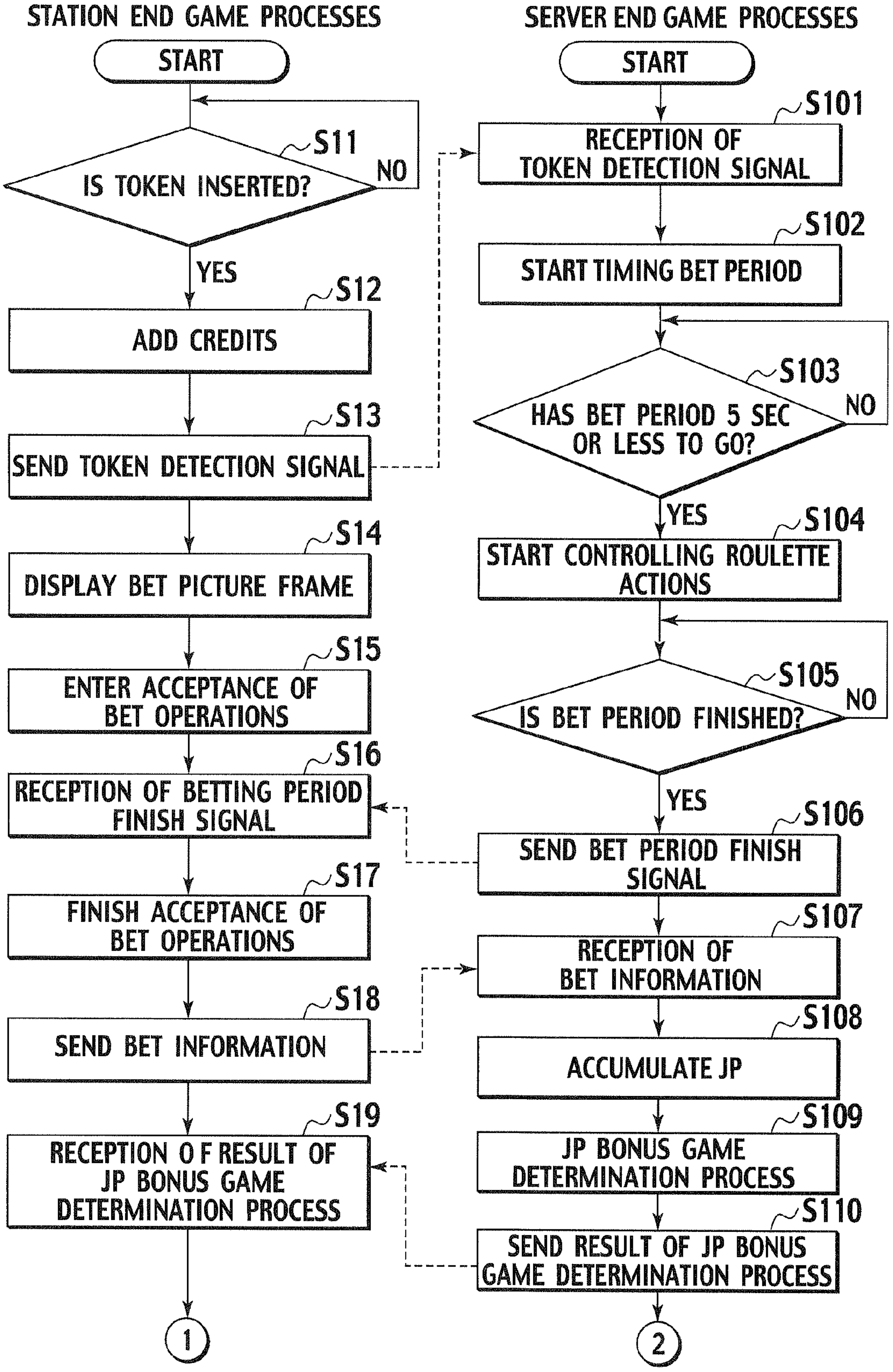
FIG. 12 is a flowchart showing part of the gaming process of the roulette game machine according to the first embodiment.
Figure 13:
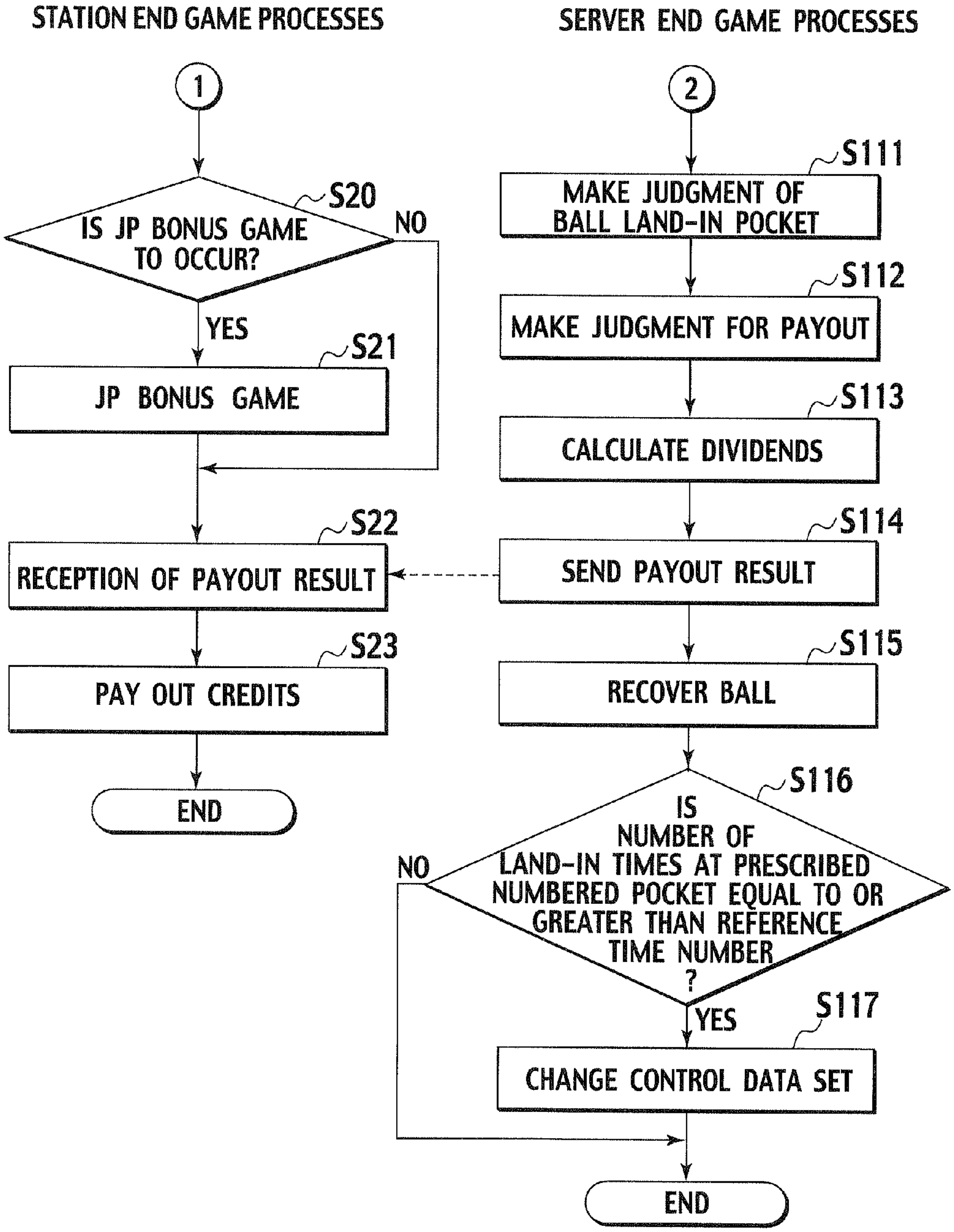
FIG. 13 is a flowchart showing part of the gaming process of the roulette game machine according to the first embodiment.

Description is now made of the flow of station end game processes at the above-noted station 4, with reference to FIG. 12 and FIG. 13. At a step S11, the station controlling CPU 91 judges whether or not a token or bill of an 'as-recognized' player to the CPU 91 (referred herein sometimes to "recognized player" or simply to "player") is inserted, in accordance with a detection signal of the token sensor 97. In the case of no insertion of token or bill ('no' at the step S11), the station controlling CPU 91 waits for an insertion. In the case of an insertion of token or bill ('yes' at the step S11), it goes to a step S12.

At the step S12, the station controlling CPU 91 stores in the RAM 93 a data of an amount of credits corresponding to the number of inserted pieces. Next, at a step S13, the station controlling CPU 91 sends to the server 13 a token detection signal indicating an insertion of token or bill.

Next, at a step S14, the station controlling CPU 91 displays on the video display 8 of the station 4 a bet picture frame 61 shown in FIG. 4. Next, at a step S15, the station controlling CPU 91 starts timing a bet period in which the recognized player can bet a chip, and enters acceptance of bet operations. Accordingly, the player taking part of the game is allowed, during the bet period in which any betting method is acceptable, to operate the touch panel 50 to thereby bet own chips on bet fields 72 associated with a number corresponding to own prediction (refer to FIG. 4). It is noted that for specific betting methods using the bet frame picture 61, the description has been given, and is not repeated. Further, during the bet period once started, it is allowed for a player at any station else to participate in the game. According to the present embodiment, the roulette game machine 1 can accept twelve players as the maximum to participate in the game. In addition, for a current game continued from a previous game, the acceptance of bet operation is started immediately after an end of the previous game.

At a step S16, the station controlling CPU 91 receives from the server controlling CPU 81*a* bet period finish signal representing a finish of the bet period, and displays on the video display 8 of the station 4 a picture frame of the effect that the bet period is finished, to finish acceptance of bet operations on the touch panel 50 (step S17). Thereafter, the station controlling CPU 91 sends a signal of information on bet operations of the player at the station 4, for example, designated bet fields 72 and (bet amounts as) the numbers of chips bet on the bet fields 72 (step S118).

Next, at a step S19, the station controlling CPU 91 receives from the server 13 a result of a later-described JP bonus game determination process to be implemented by the server controlling CPU 81. The result of JP bonus game determination process involves a combination of results of determination as to whether or not a prescribed bonus game is to occur at each station 4, whether or not a payout of JP credit is to be made, at which station 4 of the twelve stations 4 the payout of JP credit is to be made, and by which type of JP credit the payout is to be made.

Next, at a step S20 in FIG. 13, the station controlling CPU 91 judges whether or not to work an occurrence of the JP bonus game in accordance with the result of JP bonus game determination process received at the step S19. In the case of judgment to work an occurrence of the JP bonus game in this station 4, it executes the JP bonus game having a prescribed selection expression for a winning of JP (step S21), and displays on the video display 8 a result of the game (i.e. whether or not a JP is won, or whether or not a JP credit is payable) to be in accordance with the result of JP bonus game determination process received at the step S19.

In the case of judgment at the step S20 not to work any occurrence of the JP bonus game in this station 4, as well as a process at the step S21, the station controlling CPU 91 receives payout information on a result of payout of credit sent from the server controlling CPU 81 (step S22). It is noted that the payout information may indicate at least one of a JP credit amount and a credit amount calculated depending on a result of roulette game.

Next, at a step S23, the station controlling CPU 91 makes a payout of credit in accordance with the payout information received at the step S22. More specifically, the station controlling CPU 91 stores in the RAM 93 both of a JP credit amount and a credit amount calculated depending on a result of roulette game. And, with the payout button 48 pressed, the payout is made through the token payout opening 9 by a number of tokens (typically, one token per one credit) corresponding to the credit amount stored in the RAM 93.

Thereafter, if the game is continued at any station 4, the flow again goes to the step S14, where it has a restarted bet period for transition to the next roulette game. On the other hand, if the game is finished at any and all stations 4, the gaming process goes to an end.

Description is now made of the flow of server end game processes, with reference to FIG. 12 and FIG. 13. First, at a step S101, the server controlling CPU 81 waits for reception of a token detection signal sent from any station controlling CPU 91. Upon first reception of a token detection signal sent from any station controlling CPU 91, the server controlling CPU 81 increments by unity a roulette game execution time number counter (which is provided in the RAM 83, with an initial value "0"), and goes to a step S102.

In the step S102, the server controlling CPU 81 starts timing a bet period from the time when a token or bill is inserted by a player who has first participated in the game. The bet period is an interval of time that allows any bet to be input. During the bet period, any player taking part of the game is allowed to operate a facing touch panel 50 to thereby bet own chips on bet fields 72 associated with a number corresponding to own prediction.

Next, at a step S103, the server controlling CPU 81 judges whether or not the bet period has five seconds or less to go in the rest. It is noted that a remaining time of the bet period is given on a facing bet time display 69 (refer to FIG. 4). If it is judged that the rest is still longer than five seconds, the flow again goes to the step S103. On the other hand, in the case of judgment that the rest is five seconds or less, the flow goes to a step S104.

At the step S104, the server controlling CPU 81 sends to the CPU 101 of the roulette device 3 a control signal to start the roulette device 3. With the control signal received, the CPU 101 starts controlling the following actions, referring to a control data set stored in the RAM 103. It is noted that the CPU 101 has any set of control data stored in the RAM 103, when starting the roulette game machine 1.

First, the CPU 101 drives the wheel drive motor 106 for a motor drive time set up in the control data set, to spin the roulette wheel 22.

Then, after lapse of a prescribed period (e.g. 20 seconds) from a start of spinning the roulette wheel 22, the CPU 101 waits for a shot-timing-oriented reference numbered pocket 23 passing a prescribed position (it is noted that a judgment is made as to whether or not the reference numbered pocket 23 has passed the prescribed position in dependence on a detection signal from the pocket location detecting circuit 107), and shoots a ball 27 after lapse of a shot delay time from detection of the reference numbered pocket 23 having passed the prescribed position. The ball 27 is then shot by an initial velocity set up in the control data set. The CPU 101 is adapted to thereby control implementation of a roulette game, so that the ball 27 lands in a numbered pocket 23 within a prescribed region (i.e. a numbered pocket 23 residing in a biased region) with an increased probability.

Next, at a step S105, the server controlling CPU 81 judges whether or not the bet period is finished. In the case of judgment that the bet period is not finished yet, it waits for a finish of the bet period.

On the other hand, in the case of judgment that the bet period is finished, the server controlling CPU 81 sends to each station controlling CPU 91*a* bet period finish signal representing a finish of bet period (step S106).

Next, at a step S107, the server controlling CPU 81 receives from each station controlling CPU 91*a* signal of bet information (designated bet fields 72, numbers of chips bet (bet amounts) on the bet fields 72, and betting methods) of a player at the station 4, and stores the same in the bet information storage region 83*a* of the RAM 83.

Next, at a step S108, the server controlling CPU 81 adds: an amount of credit equivalent to 0.30% of a total of credits bet at respective stations 4, as they are received from them at the step S107, for accumulation on a mini JP credit amount stored in the mini JP accumulation storage region 83*c* of the RAM 83; an amount of credit equivalent to 0.20% of the total of bet credits for accumulation on a major JP credit amount stored in the major JP accumulation storage region 83*d* of the RAM 83; and an amount of credit equivalent to 0.15% of the total of bet credits for accumulation on a mega JP credit amount stored in the mega JP accumulation storage region 83*e* of the RAM 83. Further, these JP credit amounts are based on for the server controlling CPU 81 to update indicated values on the mini JP display 75, the major JP display 74, and the mega JP display 73.

Next, at a step S109, the server controlling CPU 81 implements the above-noted JP bonus game determination process. In this process, the server controlling CPU 81 employs a random value sampled by a sampling circuit or the like, to determine whether or not the JP bonus game should occur at each station 4, and in the case the JP bonus game is to occur, it determines whether or not a payout of JP credit should be made. In the case of determination to make the payout of JP credit, the server controlling CPU 81 determines at which station 4 of the twelve stations 4 the payout of JP credit should be made, and further determines by which type of JP credit the payout should be made.

Next, at a step S110, such processes of the step S110 are based on for the server controlling CPU 81 to send a result of the JP bonus game determination process to each station 4.

Next, at a step S111 in FIG. 13, the server controlling CPU 81 sends a control signal to the roulette device 3, to thereby drive the ball sensor 105. The ball sensor 105 detects a ball land-in pocket, and outputs to the server controlling CPU 81*a* detection signal that represents the result of detection. The server controlling CPU 81 makes a judgment of ball land-in pocket in accordance with the detection signal given from the ball sensor 105. Further, with reference to a location of the ball land-in pocket and a set of control data stored in the RAM 103 (referred herein sometimes to "reference control data"), the server controlling CPU 81 judges whether or not the ball-land-in pocket belongs to a biased region, and simply when this belongs, it works to increment by unity a value of a ball land-in time number counter (which is provided in the RAM 103, with an initial value "0").

Next, at a step S112, the server controlling CPU 81 makes, with reference to the bet information of each station 4 received at the step S107 and a result of the judgment of ball land-in pocket made at the step S111, a judgment for each station as to whether or not any number on which any chip is wagered is coincident with the number of ball land-in pocket.

Next, at a step S113, the server controlling CPU 81 executes a dividend calculation process. In the dividend calculation process, it recognizes respective chips wagered on the ball land-in number at each station 4, and employs dividend payout ratios of associated bet fields 72 stored in the dividend storage region 82*a* of the ROM 82, to calculate a credit amount payable at each station 4.

Next, at a step S114, the server controlling CPU 81 sends to each station 4 a signal of information for payout of credit with respect to the credit amount calculated at the step S113. Further, to the station 4 at which a payout of JP credit is to be made, the server controlling CPU 81 sends a signal of information for payout of credit with respect to a payable JP credit amount.

Next, at a step S115, the server controlling CPU 81 sends a control signal to the roulette device 3, to thereby drive the ball recovery device 108 installed under the roulette wheel 22, for recovery of a ball 27 on the roulette wheel 22. The recovered ball 27 will be repeatedly shot onto the roulette wheel 22 of the roulette device 3 in the next and subsequent games.

Next, at a step S116, the server controlling CPU 81 judges, for the number of times of execution of roulette game, whether or not the number of land-in times at a prescribed numbered pocket 23 or the number of land-in times of numbered pockets 23 in a prescribed region has become equal to or greater than a reference time number set up by a player through an associated reference time number increment switch 78. More specifically, it judges if such a condition is met that the ball land-in time number counter has a value equal to or greater than a reference time number set up by a player through an associated reference time number increment switch 78. If this condition is met, the server controlling CPU 81 goes to a step S117. Unless the condition is met, the flow of server end game processes goes to an end.

At the step S117, the server controlling CPU 81 sends a change command signal to the CPU 101 of the roulette device 3. The CPU 101, as it has received the change command signal, samples a random number, and on basis of the sampled random number, determines from among a plurality of control data sets stored in the ROM 102 such a control data set that is different from a current control data set stored in the RAM 103, as an object to be referred to, and replaces the control data set stored in the RAM 103 by the control data set thus determined.

The control data set, which includes a motor drive time, a ball initial velocity, and a shot delay time, is set up so that the ball 27 lands in a certain region of the six regions A to F on the roulette wheel 22 with an increased probability, and hence the replacement of control data set changes the probability by which the ball 27 lands in any region of the regions A to F.

It is noted that although in this embodiment the control data set is changed when such a condition is met that the number of land-in times at a prescribed numbered pocket 23 becomes equal to or greater than a reference time number, the control data set may be changed when another condition is met. As the other condition, there may be taken, for example, that the ball continuously lands in an identical numbered pocket 23 a predetermined number of times, that the ball continuously lands in any numbered pocket in an identical group (region) a predetermined number of times, that a prescribed bonus (e.g. mystery bonus or jackpot) has occurred, or that a total amount of currency value wagered on any number of a prescribed group (e.g. such a group as having a higher ball land-in probability) has reached a prescribed value.

As will be seen from the foregoing, according to this first embodiment, the roulette game machine 1 is adapted to determine from among a plurality of control data sets another control data set different from a current control data set, as an object to be referred to, when the number of land-in times at a prescribed numbered pocket 23 has become equal to or greater than a reference time number in roulette games. Therefore, if the number of land-in times at the prescribed numbered pocket 23 becomes equal to or greater than the reference time number, the probability by which the ball 27 lands in any region of the six regions A to F on the roulette wheel 22 is changed, as well, and the player can enjoy a new play, such as predicting the timing when the land-in probability changes, or predicting which is the prescribed numbered pocket 23.

Second Embodiment

Description is now made of a roulette game machine 1 according to a second embodiment of the present invention. The second embodiment is different from the first embodiment in that in the first embodiment the reference time number as a trigger for replacement of control data set is set up by the reference time number increment switch 78, but in the second embodiment the reference time number as a trigger for replacement of control data set is changed randomly after the change of control data set.

Figure 14:
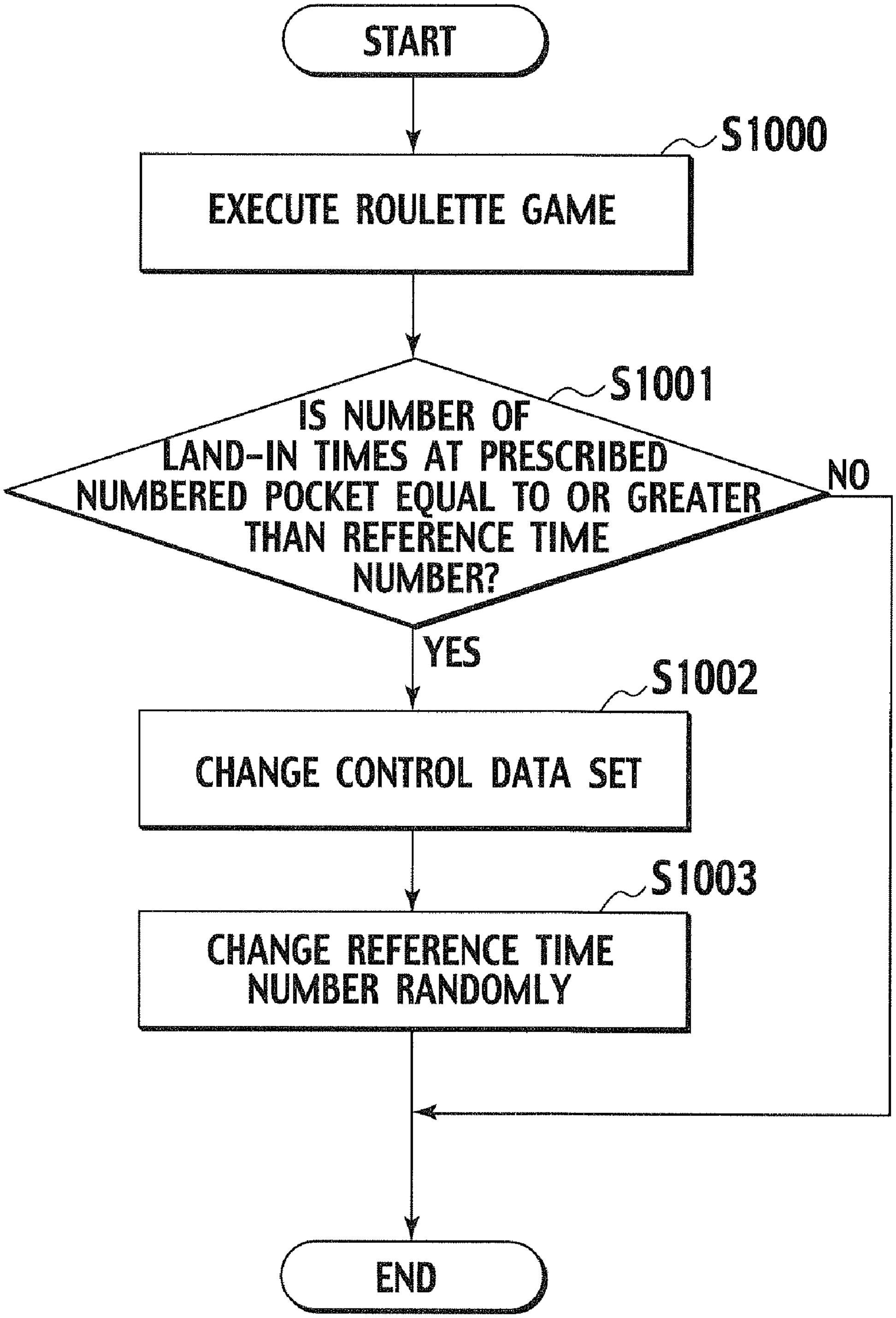
FIG. 14 is a flowchart showing an outline of a gaming process of a roulette game machine according to a second embodiment of the present invention.

FIG. 14 shows in a flowchart an outline of processes according to the second embodiment of the present invention. Description is now made along the flowchart of FIG. 14. At a step S1000, the roulette game machine 1 executes a roulette game. At a step S1001, the roulette game machine 1 judges whether or not the number of land-in times of ball 27 at a prescribed numbered pocket 23 is equal to or greater than a randomly determined reference time number, and if it is equal to or greater than the reference time number, the flow goes to a step S1002. Unless this condition is met, the process goes to an end. At the step S1002, the roulette game machine 1 changes the control data set to be referred to.

Thereafter, at a step S1003, the roulette game machine 1 executes a process of randomly changing the reference time number as a trigger for replacement of control data set. More specifically, the server controlling CPU 81 is adapted to perform a sampling of random number, and refer to a sampled random number to randomly change the reference time number as a trigger for replacement of control data set. Thereafter, the roulette game machine 1 finishes the process.

For other processes, it is noted that they are like to the first embodiment.

In the second embodiment, the reference time number as a trigger for replacement of control data set is randomly changed, so that the player can enjoy a new play, such as predicting the timing when the land-in probability changes, or predicting which is the prescribed numbered pocket 23.

There have been described embodiments of the present invention, which are mere illustration of specific examples, and in no way constitute a limitation to the present invention, so that specific configurations of respective measures can be designed or modified in an adequate manner. The embodiments of the present invention has described effects, which are simply enumerated as most preferable effects occurring from the invention, while the invention has effects thereof encompassing those described in the embodiments, without limitation thereto Further, the foregoing detailed description is made with characteristic parts centered for a facilitated understanding of the present invention. The present invention is not restricted to the embodiments disclosed in the detailed description, and may be applied in other embodiments in a variety of application fields. Further, those terms and directions used herein are employed for exact description of the present invention, and in no way used to limit construe of the present invention. Further, artisan may easily devise, from a concept of this invention disclosed herein, other configurations, systems, methods, or the like that the concept of this invention covers. Accordingly, the claims should be construed to cover equivalent configurations within a range not exceeding the range of technical thoughts of this invention. Further, the abstract is provided with an objective to allow for a prompt judgment in a simple investigation of technical contents and essences of the present application, such as by a patent office, general public agency, or technician belonging to this field of art and non-specialized to patent or legal terms or technical terms. Accordingly, the abstract has no intention to restrict the scope of this invention to be estimated by recitation in the claims. Further, for a sufficient understanding of purposes of this invention as well as peculiar effects thereof, it is desirable to construe them taking well into consideration those materials which have been disclosed ever, and the like.

The foregoing detailed description contains processes to be executed by a computer. The foregoing description and expression are given with a purpose of allowing a most efficient understanding by artisan. Respective steps employed herein to deduce a result should be understood as self-consistent steps. Further, respective steps include electric or magnetic signal transmission and reception, storage, etc. For a process in a step, such a signal may be expressed in terms of a bit, value, symbol, letter, term, numeral, etc., whereas it should be noted that they are employed simply for convenient description. Further, for a process in a step, the description may employ a common expression to human action, whereas described processes herein should be implemented by a variety of devices, as a rule. Further, for execution of steps, there may be other necessary components that will obvious from the foregoing description.

What is claimed is:

1. A gaming apparatus comprising:

a roulette wheel provided with a set of pockets each respectively given in advance a number corresponding thereto;

a memory for storing a plurality of control data for controls to bias a reception probability of receiving a ball for a respective one of subsets of the set of pockets;

a bet switch adapted for a bet operation to any pocket of the set of pockets; and a controller adapted to:

(a) execute a roulette game to accept the bet operation, and to effect, with reference to a prescribed one of the control data, a spinning of the roulette wheel and a shooting of the ball, to have an increased reception probability of the ball for a prescribed subset of the set of pockets; and (b) execute the roulette game with reference to another control data different from the prescribed control data, as a number of times of reception by the prescribed subset of the set of pockets has reached or exceeded a prescribed time number.

2. A gaming apparatus comprising:

a roulette wheel provided with a set of pockets each respectively given in advance a number corresponding thereto;

a memory for storing a plurality of control data for controls to bias a reception probability of receiving a ball for a respective one of subsets of the set of pockets;

a bet switch adapted for a bet operation to any pocket of the set of pockets;

a time number switch adapted to input a prescribed time number as a trigger for interchanging the control data; and a controller adapted to:

(a) execute a roulette game to accept the bet operation, and to effect, with reference to a prescribed one of the control data, a spinning of the roulette wheel and a shooting of the ball, to have an increased reception probability of the ball for a prescribed subset of the set of pockets; and (b) execute the roulette game with reference to another control data different from the prescribed control data, as a number of times of reception by the prescribed subset of the set of pockets has reached or exceeded the prescribed time number input by the time number switch.

3. A gaming apparatus comprising:

a roulette wheel provided with a set of pockets each respectively given in advance a number corresponding thereto;

a memory for storing a plurality of control data for controls to bias a reception probability of receiving a ball for a respective one of subsets of the set of pockets;

a bet switch adapted for a bet operation to any pocket of the set of pockets; and a controller adapted to:

(a) execute a roulette game to accept the bet operation, and to effect, with reference to a prescribed one of the control data, a spinning of the roulette wheel and a shooting of the ball, to have an increased reception probability of the ball for a prescribed subset of the set of pockets; and (b) execute the roulette game with reference to another control data different from the prescribed control data, as a number of times of reception by the prescribed subset of the set of pockets has reached or exceeded a prescribed time number, to change the prescribed time number randomly.

4. A gaming apparatus comprising:

a roulette wheel provided with a set of pockets each respectively given in advance a number corresponding thereto, the set of pockets being distributed in a plurality of regions;

a memory for storing a plurality of control data for controls to bias between the regions a reception probability of receiving a ball for a corresponding one of subsets of the set of pockets belonging to a respective one of the regions;

a bet switch adapted for a bet operation to any pocket of the set of pockets; and a controller adapted to:

(a) execute a roulette game to accept the bet operation, and to effect, with reference to a prescribed one of the control data, a spinning of the roulette wheel and a shooting of the ball, to have an increased reception probability of the ball for a prescribed subset of the set of pockets belonging to a prescribed one of the regions; and (b) execute the roulette game with reference to another control data different from the prescribed control data, as a number of times of reception by the prescribed subset of the set of pockets belonging to the prescribed region has reached or exceeded a prescribed time number.

5. A playing method of a gaming apparatus including a memory and a controller, the method comprising the steps of:

executing a roulette game with the controller to accept a bet operation at a pocket of a set of pockets of a roulette wheel, each respective pocket provided with a corresponding number in advance, and to effect, by reference to the memory which includes a prescribed one of a plurality of control data for biasing a reception probability of receiving a ball for a respective one of subsets of the set of pockets, a spinning of the roulette wheel and a shooting of the ball, to increase a reception probability of the ball for a prescribed subset of the set of pockets; and determining, by reference to the memory, another control data different from the prescribed control data to be a target of reference, as a number of times of reception by the prescribed subset of the set of pockets has reached or exceeded a prescribed time number.

6. A playing method of a gaming apparatus including a memory and a controller, comprising the steps of:

executing a roulette game with the controller to accept a bet operation at a pocket of a set of pockets of a roulette wheel, each respective pocket provided with a corresponding number in advance, and to effect, by reference to the memory which includes a prescribed one of a plurality of control data for biasing a reception probability of receiving a ball at a respective one of subsets of the set of pockets, a spinning of the roulette wheel and a shooting of the ball, to to increase a reception probability of the ball for a prescribed subset of the set of pockets; and determining, by reference to the memory, another control data different from the prescribed control data to be a target of reference, as a number of times of reception by the prescribed subset of the set of pockets has reached or exceeded a prescribed time number input by a time number switch.

7. A playing method of a gaming apparatus including a memory and a controller, comprising the steps of:

executing a roulette game with the controller to accept a bet operation to a pocket of a set of pockets of a roulette wheel, each respective pocket provided with a corresponding number in advance, and to effect, by reference to the memory which includes a prescribed one of a plurality of control data for biasing a reception probability of receiving a ball at a respective one of subsets of the set of pockets, a spinning of the roulette wheel and a shooting of the ball, to to increase a reception probability of the ball for a prescribed subset of the set of pockets;

determining, by reference to the memory, another control data different from the prescribed control data to be a target of reference, as a number of times of reception by the prescribed subset of the set of pockets has reached or exceeded a prescribed time number; and changing the prescribed time number randomly, after said another control data has been determined to be the target of reference.

8. A playing method of a gaming apparatus including a memory and a controller, comprising the steps of:

executing a roulette game with the controller to accept a bet operation to a region, each region respectively including a corresponding one of subsets of a set of pockets of a roulette wheel, each region provided with corresponding number in advance, and to effect, by reference to the memory which includes a prescribed one of a plurality of control data for biasing a reception probability of receiving a ball at a corresponding subset of the set of pockets belonging to a respective region, a spinning of the roulette wheel and a shooting of the ball, to increase a reception probability of the ball for a prescribed subset of the set of pockets belonging to a prescribed region; and determining, by reference to the memory, another control data different from the prescribed control data to be a target of reference, as a number of times of reception by the prescribed subset of the set of pockets belonging to the prescribed region has reached or exceeded a prescribed time number.

* * * * *